United States Patent [19]
Betts et al.

[11] 3,907,503
[45] Sept. 23, 1975

[54] TEST SYSTEM

[75] Inventors: Cleo Elmer Betts, Elkhart; John Kendall Marsh, Granger, both of Ind.

[73] Assignee: Miles Laboratories, Inc., Elkhart, Ind.

[22] Filed: Jan. 21, 1974

[21] Appl. No.: 435,001

[52] U.S. Cl. .......... 23/253 R; 23/230 R; 23/253 TP
[51] Int. Cl.² ................ G01N 21/06; G01N 21/20; G01N 21/28
[58] Field of Search ............. 23/230 R, 253 R, 259, 23/253 TP; 235/151.13, 151.3, 151.35

[56] References Cited
UNITED STATES PATENTS

| | | | |
|---|---|---|---|
| 3,476,515 | 11/1969 | Johnson et al. | 23/253 X |
| 3,497,320 | 2/1970 | Blackburn et al. | 23/253 X |
| 3,504,376 | 3/1970 | Bednar et al. | 23/253 X |
| 3,526,480 | 9/1970 | Findl et al. | 23/253 R |
| 3,620,678 | 11/1971 | Guigan et al. | 23/253 R |
| 3,680,967 | 8/1972 | Engelhardt | 23/253 X |
| 3,770,382 | 11/1973 | Carter et al. | 23/259 |

Primary Examiner—R. E. Serwin
Attorney, Agent, or Firm—George R. Caruso

[57] ABSTRACT

A test system for the semi-automatic analysis of chemical constituents in a test fluid which comprises test devices having test reagents and code means associated therewith and an instrument which receives the test devices and is programmed by the device code means for automatically reading the particular test reagents associated with the particular test device being used. Preferably the test reagents are in a dry form, immobilized in or on a carrier member which upon contact with the test fluid can be manually presented to the instrument. Another preferable embodiment of the present device comprises the use of the code means to calibrate the instrument each time a test device is introduced thereto.

38 Claims, 9 Drawing Figures

TEST SYSTEM

BACKGROUND OF THE INVENTION

Classical instrumental analytical chemistry has always required that a test reagent which usually comprises several separate components, be physically manipulated and manually contacted with the fluid being tested. This is usually followed by manually presenting the chemical reactants to an instrument for a quantitative readout or estimation of the reaction products. Recently, however, completely automatic instruments have been developed to eliminate the need for manual manipulation of the chemical reactants and which give programmed readouts. Such instruments are almost always extremely expensive and complicated and the servicing of such instruments requires highly skilled technicians.

On the other hand, when attempts are made to simplify automatic systems, one usually encounters the problem that semi-automatic instrument parameters must be set manually. In such instruments there is always the danger that the instrument will be incorrectly programmed by the technician. Thus, a proper balance must be made between complex automatic instruments which require highly skilled service personnel and semi-automatic or manual instruments which require the programming and/or manipulation thereof by relatively unskilled technical operators.

Another disadvantage associated with automatic and semi-automatic instrumental analysis systems is that when a malfunction occurs in the instrument, all analytical activity is suspended and recourse must be had to alternative procedures which are not familiar to the technician.

DESCRIPTION OF THE PRIOR ART

The prior art relating to automatic and semi-automatic analytical chemistry instruments is so extensive as to be beyond the scope of this specification. As for the preferred and specific embodiments of this invention, there is no known direct prior art.

SUMMARY OF THE INVENTION

The present invention relates to a simplified two component test system for semi-automatically determining any selected ones of a plurality of constituents in a test fluid. One component consists of a plurality of different coded test devices each containing one or more immobilized test reagents which give detectable chemical responses or reactions to the particular constituents in the test fluid being assayed. The second component comprises a test instrument adapted to receive any selected one of the coded test devices. This instrument contains a code sensing means and a reaction sensing means which is automatically activated by the code sensing means to read those test reagents associated with the test device presented to the instrument. A readout means is included which is coupled to the code sensing means and the reaction sensing means to correlate the response of the instrument to the particular device presented to the instrument and to report the results thereof. Preferred embodiments comprise the use of dry or immobilized test reagents incorporated with carrier members, such as strips of transparent plastic foil, to form the test devices of the present invention. These test devices can be used independently of the instrument if the response thereof is chromogenic. Another preferred embodiment is the use of a code means associated with the test device which not only provides for the programming of the instrument according to the test device presented but also automatically calibrates the instrument each time a test is conducted.

DESCRIPTION OF THE PREFERRED EMBODIMENTS

Figure 1:
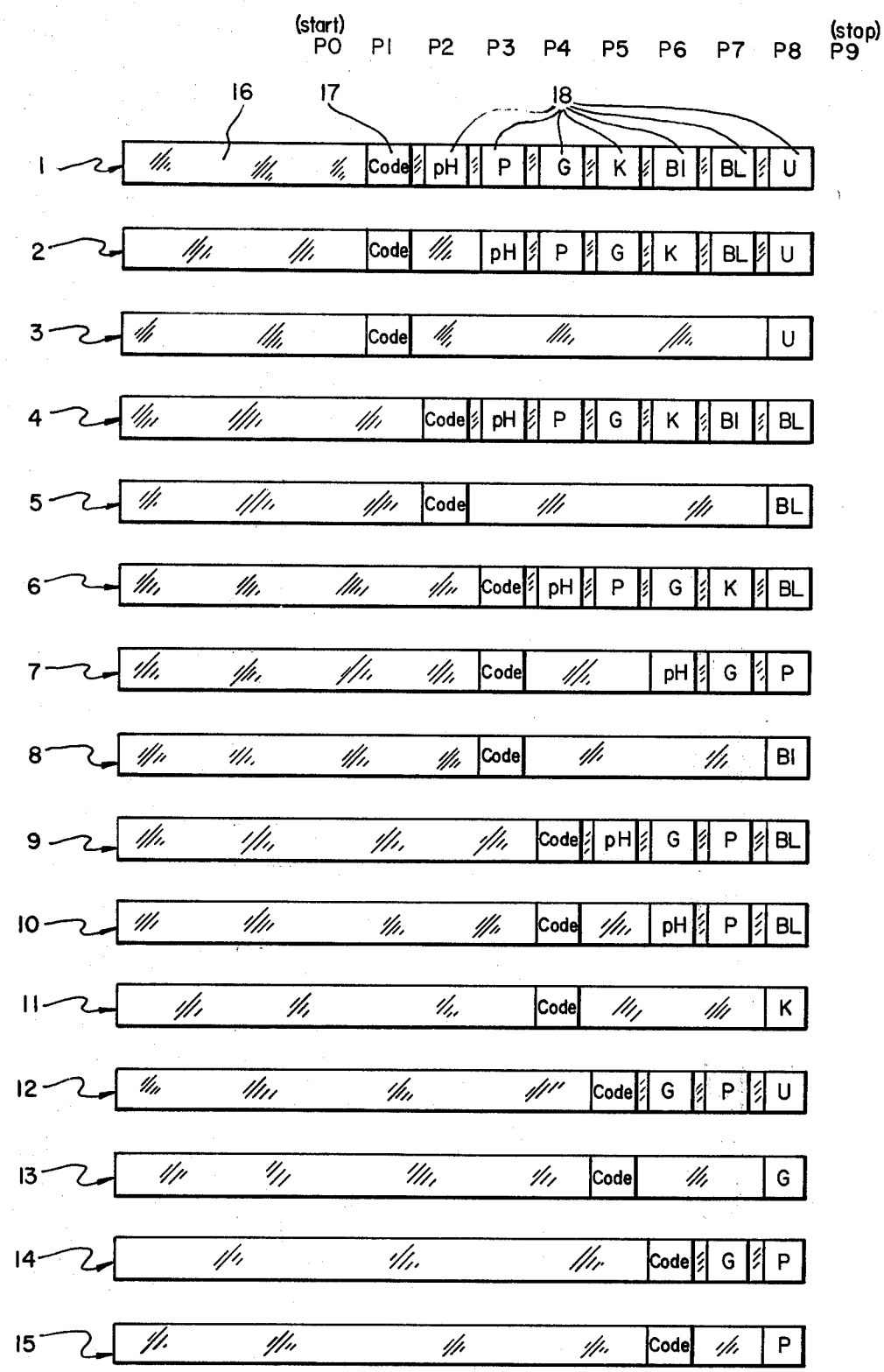
FIG. 1 is a plan view showing fifteen different test devices of the type which is useful in the test system of the present invention.

The test devices of the present invention each comprise three components: (1) one or more test reagents which are specifically reactable with the particular substance or substances to be detected in the test fluid; (2) a carrier member for the test reagent or reagents, and (3) a code means associated with the test device which identifies the particular test device presented to the test instrument, which instrument will be described hereinafter.

Each of the test reagents associated with the test devices of the present invention usually comprises one or more chemical constituents which specifically react with the substance in the test fluid to give a detectable chemical response which relates to the amount of the constituent in the test fluid, which response may be measured instrumentally. This response may be spectral, such as by the selective reflectance of visual, ultraviolet or infrared radiant energy or it may be any other physical or chemical effect of any specific reaction between the test reagent and the constituent being detected, which effect is measurable using instrumental reaction sensing means. The test reagent is preferably in a dry or substantially dry form and is incorporated with a carrier member as will be described hereinafter.

Specific test reagents will be described in detail in the Examples; however, it should be noted here that preferable test reagent systems comprise one or more chemicals which can be combined prior to use and retain their reactivity for extended periods of time. Another preferable feature of such test reagents is the ability thereof to detect the level of the particular constituent being assayed in the concentration range usually encountered in the test fluid.

The second essential component of the test device is the carrier member. This component comprises a means for retaining or holding the test reagent and preferably for allowing facile contact between the test reagent and test fluid. Although a simple container may suffice for such a carrier member, it has been found that a bibulous matrix such as paper is ideally suited for incorporating the test reagent in a dry or substantially dry format. As will be explained more fully in the description of FIG. 1 and later in the operation of the present test system, it is preferable to utilize a strip of transparent plastic film to hold individual paper matrices into or onto which the test reagents are impregnated. In such an embodiment the paper matrix and the transparent plastic film together form the carrier member and the part of the test device comprising the test reagent incorporated into the matrix is called the reagent block.

Alternatively, the carrier member may comprise simply a strip of transparent plastic film on which the test reagents are affixed by any suitable means such as, for example, by a polymeric material. In such an exemplary embodiment the test reagent is dissolved or dispersed in an organic solvent solution of a polymer, such as cellulose acetate, and the solution or dispersion is cast or otherwise applied onto the transparent film and dried.

The carrier members described hereinabove may be in the form of individual strips to which one or several paper matrices are attached, or they may be in the form of continuous rolls of plastic film comprising units of individual test devices which may be torn off, contacted with the test solution and presented to the instrument.

The third component of the test device is the code means. This enables the instrument to determine which of several test devices, having one or more different test reagents associated therewith, is presented so that the instrument is programmed to read that particular test device. The code means is preferably a distinctive indicia or placement thereof associated with the carrier member, said code means being specific for a particular test device and recognizable by the instrument. The code means may be a series of characters or marks, each peculiar to a particular test device in a series of devices. The code means may also be a particular color which the code sensing means of the instrument can recognize, as will be explained more fully hereinafter. The code means may also simply consist of an opaque area, the placement of which is distinctive for each test device. Other code means and formats will be apparent from the above and the ensuing disclosure.

Exemplary of the various types of indicia which may serve as code means for the test devices of the present invention are: symbols such as diamonds, squares, circles, and so forth; several marks of the same type such as a series of parallel bars; names, such as the name of the particular test, i.e. glucose, protein, and so forth; colors; numbers; slots; holes, and so forth. The only limiting factor in selecting the indicia for the code means is that the instrument code sensing means must be capable of recognizing the indicia and distinguishing one from another as well as correlating the particular indicia to the test device.

A preferable code means is shown in FIG. 1 and will be described more fully later; however, basically this preferable means comprises an opaque area or code block placed on a transparent strip or carrier in predetermined spacial relationship with one or more reagent areas or blocks on the same strip, the location of the reagent block or blocks with respect to the code block being different for each of the test devices used with the test instrument. In use, a test device presented to the instrument is advanced to a position which interrupts a light path between a light source and light sensing means, such as a photosensitive element, the relative positions of the code block and the reagent block being indicative of a specific test device.

Referring now to the test instrument, there are four facets of this instrument which will be described. The first is that the instrument must be capable of receiving or is adapted to receive the test devices of the present invention. Secondly, the instrument must have a code sensing means associated therewith in order to read the code means of the test device and translate this signal into a calibration reference signal and a command for the instrument to read the particular test reagent or reagents of the test device. Third, the instrument must have a reaction sensing means or receptor to detect and accumulate the response from the reaction of the test reagent and the constituent in the test fluid being detected. The fourth component or facet of the instrument is the readout means which translates the response of the code sensing means and the reaction sensing means into a value which is indicative of the quantity of the constituent being assayed in the test fluid.

These facets or components will now be individually discussed.

The first facet or aspect of the test instrument is that it must be able to receive the test device relating thereto. In other words, if the test device response is a color change on a paper matrix, the test instrument must be capable of receiving the paper matrix, and the reaction sensing means of the instrument must be capable of reading the response, for example, by reflectance spectrophotometry.

The code sensing means may be any electronic device, component or circuit which can read, identify and electronically process the indicia of the code means of the test device to enable the instrument to identify the particular test being presented. The code sensing means may also perform other functions such as that of a light sensitive detector which can be used to command the instrument to read a response at a particular time. This will be explained more fully hereinafter.

More specifically, the code sensing means may be a light sensitive detector comprising a light source directing a light beam at a photosensitive element or photosensor or it may be a complex word or symbol reader such as those used to read numbers on commercial or financial instruments or notes. Additionally, the code sensing means may be a color sensing device which identifies a particular color or shade of color and correlates the color or shade with a particular test device. Shades of gray may also be used to identify the device. The code sensing means may also be one which identifies a particular number of parallel bars or opaque marks on the test device and accordingly identifies a specific device. It will be appreciated from the above, that numerous code means and code sensing means may be used in conjunction with the present invention.

The third part of the test instrument is the reaction sensing means. This component or means basically comprises the part of the test instrument which recognizes and quantitatively measures the extent of the chemical reaction between the test reagents associated with the test device and the particular constituents or chemicals being tested for in the test fluid. The reaction sensing means may simply be a photosensitive element or photosensor such as a photoelectric cell which measures the light reflected from a reagent block after a chromogenic reaction between the constituent and the test reagent, or it may comprise more complex analytical instrumentation. The controlling consideration is that the reaction sensing means must be capable of detecting and quantitatively measuring the above-noted chemical reaction, and of generating a signal which is supplied to the input of the readout means which will now be described.

The readout means correlates the output from the code sensing means and the reaction sensing means such that (1) the instrument recognizes the particular test device being presented and (2) the signal or signals generated from the reaction sensing means are processed to give an indication of the amount of a particular constituent in the fluid being tested.

A particularly advantageous and preferable readout means of the test instrument of the present invention comprises the use of an apparatus or electronic circuit comprising an input scaler, an access scaler and a read-only memory connected in such a fashion that the signal or output from the reaction sensing means is decoded to provide an indication of a characteristic or significant quantitative value or range of values for the test fluid, such as pH, clinical levels of glucose, protein, and so forth. Such circuitry is further described in the specific embodiments which follow.

Referring now to FIG. 1 of the drawing, each of the test devices numbered 1 to 15 illustrated therein comprises a strip of transparent plastic film which forms a base member 16 to one end portion of which one or more square paper matrices 18 is affixed. The other end portion of member 16 provides a handle for the test device. The matrices 18 are incorporated with test reagents which are specifically reactable with various characteristics or constituents in test fluids such as urine. In the drawing, pH represents a matrix incorporated with reagent to form a reagent block for determination of the pH, while P, G, K, BI, BL and U respectively represent reagent blocks which are specifically reactable with protein, glucose, ketones, bilirubin, occult blood and urobilinogen. In the test devices shown, the code means is an opaque area or printed area 17 which is identified in the drawing by the word "code".

In FIG. 1 the test device 1 is shown as having seven test blocks 18 and a code block 17 disposed in spaced relation on strip 16 beginning at the right hand end thereof. The positions of the code block and reagent blocks of device 1 are indicated by the letters P-1 to P-8 shown thereabove. It will be observed that with the devices 1 to 15 disposed in the vertical alignment shown, each of the devices 2 to 15 has one or more spaced reagent blocks thereon, beginning at the right hand end thereof, and one code block. Each of the reagent blocks and code blocks is in vertical alignment with one of the positions P-1 to P-8. For example, on test device 7, the code block is in position P-3 and the pH, glucose and protein reagent blocks are in positions P-6, P-7 and P-8 respectively. P-0 represents a start position on the handle portion of the strip 16 and P-9 represents a stop position beyond the right hand end of strip 16, the significance of which will appear hereinafter. The utilization of the test devices shown in FIG. 1 within the framework of the present invention will be more fully described hereinafter as will the preparation of a test device.

Figure 2:
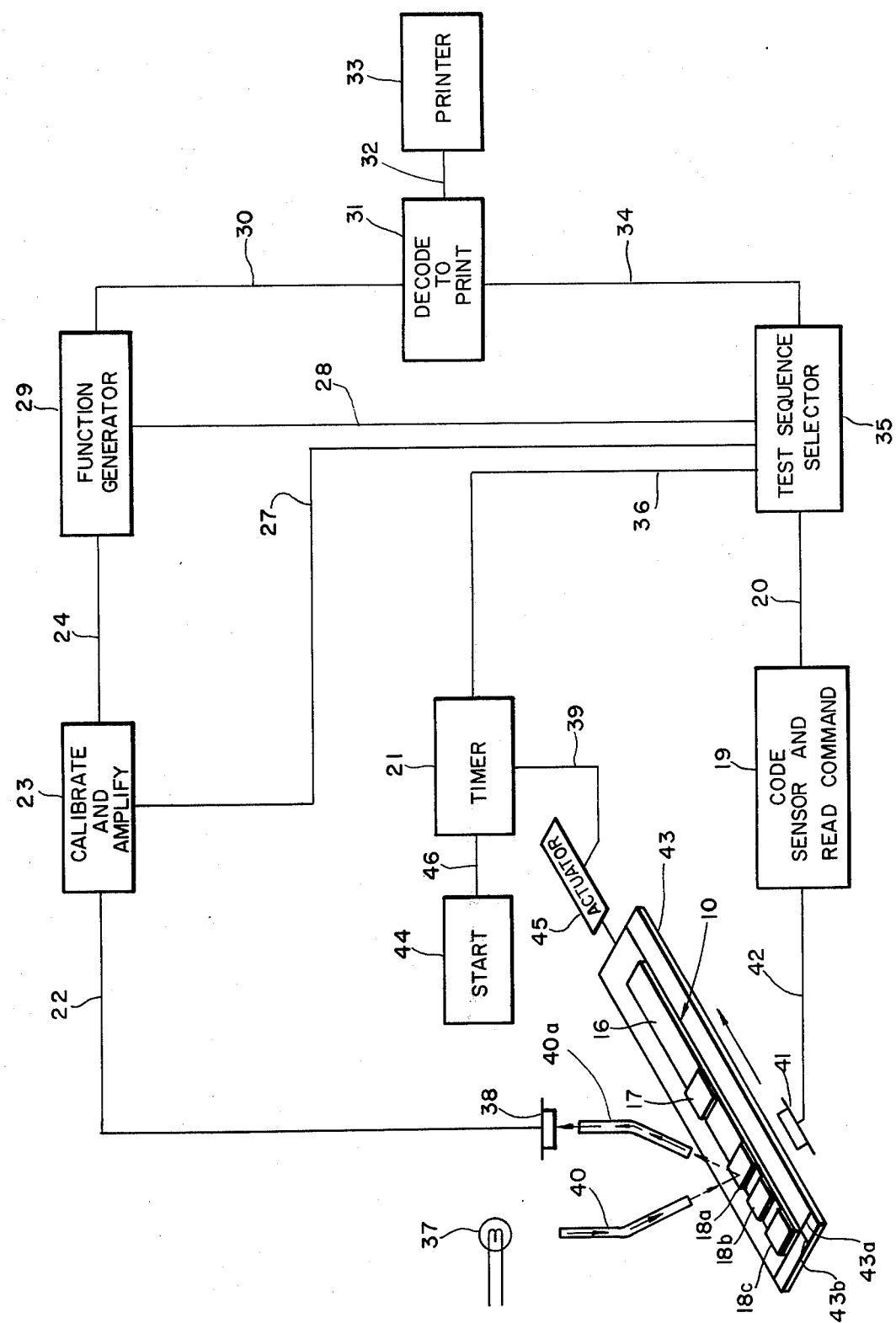
FIG. 2 is a block diagram showing one form of an instrument which is used to read the response of the test devices shown in FIG. 1.

FIG. 2 is partially a block diagram showing the various components of a test instrument as well as a perspective view of a test device as shown in FIG. 1 and certain related instrument components. This figure also shows the relationship of the test device to the test instrument. In this figure, the test device shown is the test device 10 of FIG. 1 which comprises a code means 17 consisting of an opaque white block and reagent blocks 18a, 18b and 18c affixed to a strip of transparent film 16. The reagent blocks 18a, 18b, and 18c are paper matrices impregnated respectively with pH, protein and occult blood specific test reagents.

The instrument diagrammed in FIG. 2 comprises a transparent glass or plastic table 43 suitably mounted for reciprocating movement and connected to a suitable reciprocating actuator mechanism 45. The actuator 45 is operable to move the table 43 across a light beam from a source 37 conveyed via fibre optics 40, as will be more fully described in FIGS. 3a to 3f. The table 43 may be provided with positioning means, such as guide lines 43a and 43b or suitable shoulder means (not shown) to aid in proper placement of a test device 10 thereon.

Actuator 45 is controlled by a timer 21 via path 39 which is in turn controlled by a start switch 44 via path 46. A delay circuit, not shown, may be associated with timer 21 to provide a time lag between actuation of start switch 44 and initial movement of the table 43, during which time lag a test device 10 can be placed on table 43. The light emitted from fibre optics 40 is directed toward a photosensitive element 41 suitably mounted below table 43.

Upon actuation of start switch 44, the table 43 is moved from its start position in the direction indicated in FIG. 2 to cause the code block 17 of device 10 to move into and interrupt the beam from light source 37, the light thereupon being reflected back through fibre optics 40a to a photosensitive element 38 which is suitably mounted in a position above the level of table 43. As the code block 17 passes beyond the light beam, said beam passes through the transparent film 16 in the space between code block 17 and the next adjacent reagent block 18a and through table 43, striking the photosensitive element 41. Reagent block 18a which for purposes of description will be assumed to have reacted specifically to the pH of the test fluid to produce a response, then moves into the light beam, again interrupting the light striking photosensitive element 41. Light is then reflected to photosensitive element 38 in an amount dependent upon the pH of the test fluid and the response of reagent block 18a. The reagent blocks 18b and 18c are then successively moved into readout position with movement of the table 43 in the direction indicated in FIG. 2, and the response of the reagent in each block is sensed by the photosensitive element 38. FIGS. 3a to 3f give a more detailed description of the movement of table 43 and the functioning of code block 17 as a code means.

The response of photosensitive element 38 is an electrical signal which is conducted over path 22 to the calibrate and amplify module 23. The module 23 processes the initial calibrate signal from code block 17 as well as the subsequent signals generated from the reagent blocks 18a, 18b and 18c. The signal from photosensitive element 41, which is interrupted when the light beam is interrupted by any of the blocks 17, 18a, 18b and 18c, is conducted over path 42 to the code sensor and read signal module 19.

The logic by which the code sensor interprets the interrupted signal will be explained hereinafter; however, the photosensitive element 41 may also determine when the readout circuit is to process the output of the reaction sensing means. This is accomplished by suitable circuitry, to be described, which analyzes the response of the photosensitive element 41 as the test device 10 moves through the beam from light source 37, causing a light-to-dark-to-light cycle which is repeated for each of the test reagent areas. With such circuitry the read command is given with the blocking of the beam from light source 37 to photosensitive element 41.

The timer 21 is connected to a test sequence selector 35 via path 36. Selector 35 interprets the signal received from the code sensor 19 via path 20 and identifies the test device 10 to a function generator 29 via path 28. Function generator 29 is connected to module 23 via path 24. The calibrate and amplify module 23 includes a gating circuit controlled by test sequence selector 35 via path 27 to allow only the signals originating from the test reagent areas to reach function generator 29.

The signal output of function generator 29 is transmitted to a decoder 31 via path 30, said decoder also being connected to the test sequence selector 35 via path 34. The decoder 31 processes the output signals from the function generator 29 and instructs a printer 33 via path 32 to give a visual quantitative representation of the readout from function generator 29.

Figure 3A:
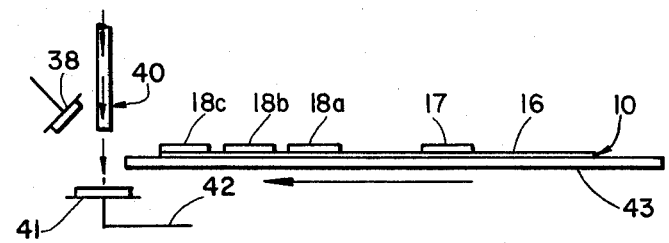
FIG. 3a to 3f are diagrammatic side-elevational views of a part of the instrument shown in FIGS. 2 and 4.
Figure 3B:
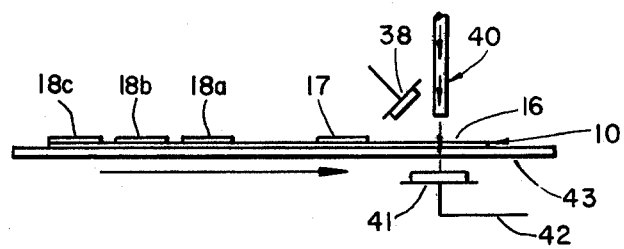
Figure 3C:
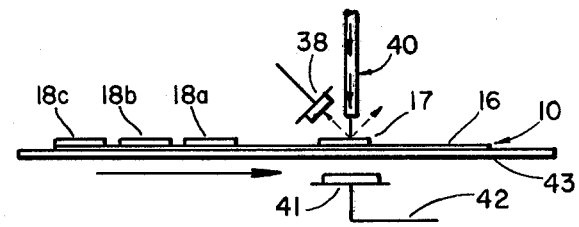
Figure 3D:
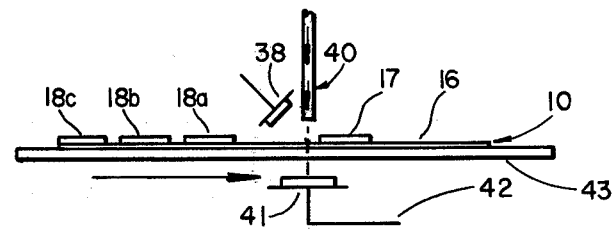
Figure 3E:
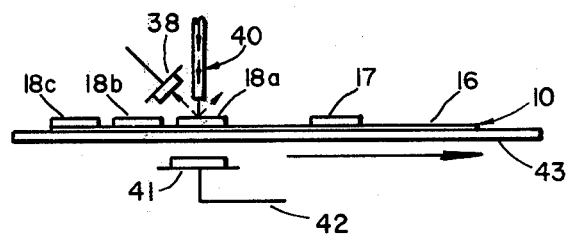
Figure 3F:
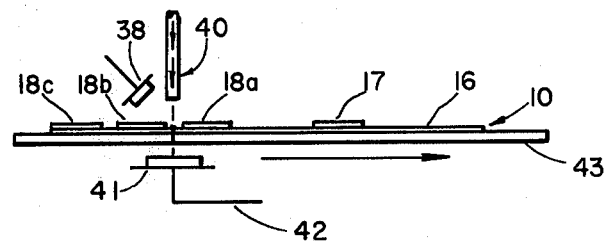
Figure 4:
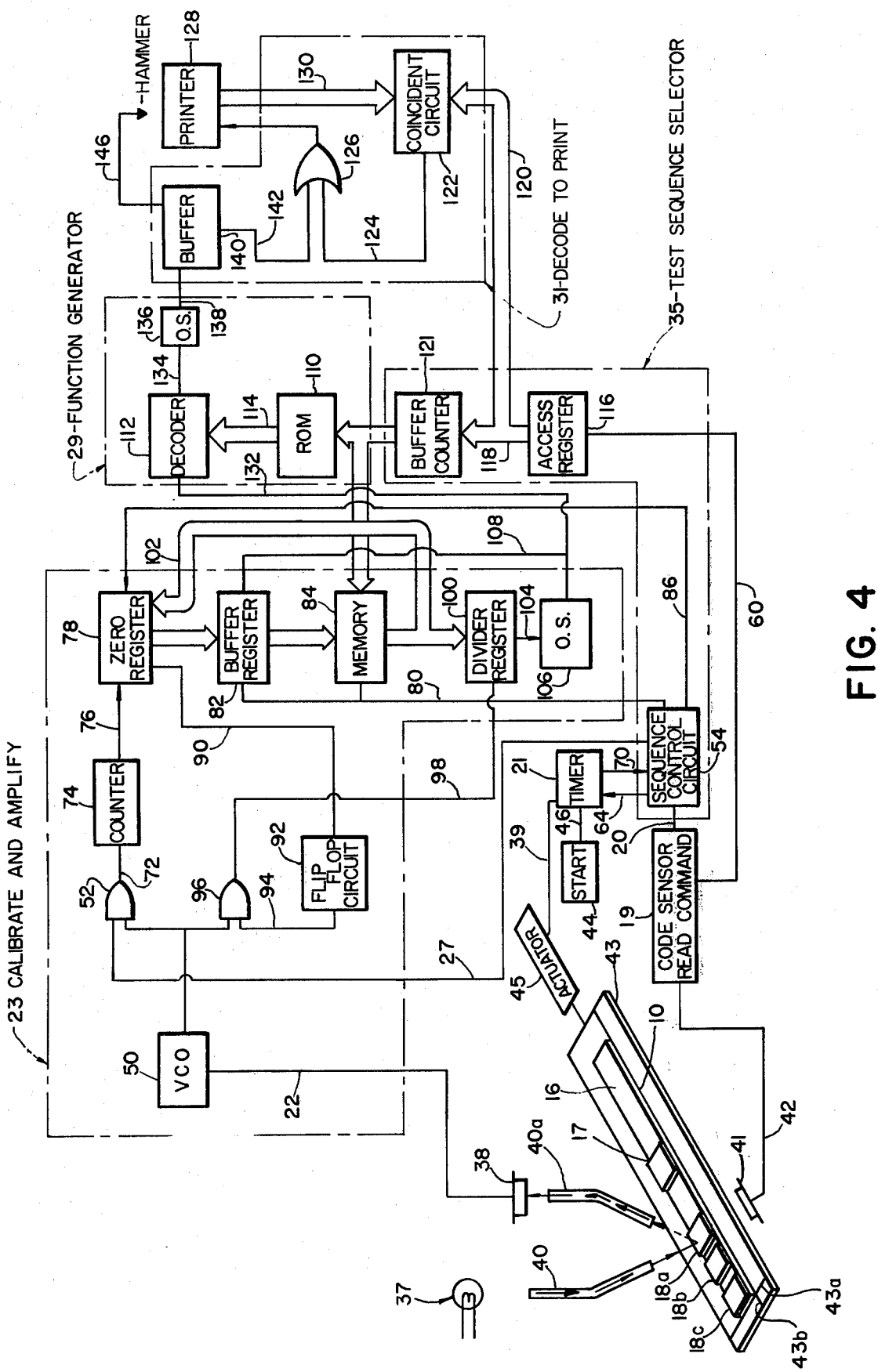
FIG. 4 is a block diagram similar to FIG. 2 showing in more detail the circuitry of an exemplary embodiment of the instrument shown in FIG. 1.

Referring now to FIGS. 3a to 3f, the following is a detailed description of how code block 17 of FIGS. 2 and 4 functions as a code means for test device 10. In its start position as shown in FIG. 3a, table 43 is positioned such that the light beam emitting from fiber optics 40 in no way impinges thereon and simply strikes photosensitive element 41. A test device 10 is contacted with a test fluid and placed on table 43 as shown in FIG. 3a. Actuator 45 (not shown in FIGS. 3a to 3e ) then moves table 43 and test device 10 in the direction shown by the arrow in FIG. 3a to their extreme leftward position shown in FIG. 3b. In this position the light beam passes through the transparent film 16 and glass table 43 and again impinges upon photosensitive element 41.

Upon reaching this position the actuator 45 is reversed and appropriate electronic circuitry associated with photosensitive elements 41 and 38 activated, and the table 43 and test device 10 commence movement in the direction of the arrow shown in FIG. 3b. As the table 43 and device 10 move across the light beam, code block 17, which is highly reflective and preferably white, in position P4 (see FIG. 1), interrupts the light impinging upon photosensitive element 41 and reflects light back to photosensitive element 38 as shown in FIG. 3c. The amount of light reflected back to photosensitive element 38 is used to calibrate the instrument, as will be described hereinafter, and interruption of the light beam striking photosensitive element 41 is interpreted by the instrument electronics as representing a block in position P4 (See FIG. 1).

The device 10 continues movement in the direction shown in FIG. 3d and the light beam again strikes element 41 upon the passage of block 17 therethrough. Continuing light striking element 41 when the device 10 is in position P5 is interpreted by the instrument as no block present in this position and the instrument records this fact. Continuing movement of device 10 causes reagent block 18a in position P6 (FIG. 1) to interrupt the light beam. It will be assumed for purposes of explanation that the reagent in this block has specifically responded to the pH of the fluid being tested to give a chromogenic change. The light reflected back from block 18a varies according to the pH of the test fluid. This is received by photosensitive element 38, and the resultant signal is processed as will be explained hereinafter. The device 10 continues its travel, moving block 18a beyond the light beam so that it again passes through transparent film 16 and glass table 43 and strikes photosensitive element 41 as shown in FIG. 3f. Continued movement of table 43 causes this procedure to be repeated with respect to blocks 18b and 18c, which will be assumed for purposes of explanation to have respectively responded to protein and blood in the test fluid, after which the table 43 and device 10 return to the normal starting position shown in FIG. 3a.

It will be appreciated that the initial movement of the table 43 and device 10 in the direction shown in FIG. 3a can be accomplished by manual movement thereof as opposed to a motor drive.

Considering FIGS. 1, 2 and 3a to 3f, the logic for the coding of the device and instrument can be described as follows: The test device starts its travel with the light beam at position P-0. If the photosensitive element 41 senses that the light beam is interrupted by an opaque area in position P-1, and if it subsequently senses that the light beam is interrupted by an opaque area at position P-2, the test sequence selector 35 makes the decision that the test device being read is test device number 1 shown in FIG. 1. Accordingly, the electronics of the instrument are programmed to read pH, protein, glucose, ketone, bilirubin, occult blood and urobilinogen test reagent areas, in that order, as the device being read moves successively through positions P-2 to P-8 to stop at position P-9. If, on the other hand, the instrument does not see an opaque area until the device being read reaches position P-6 and at position P-7 senses another opaque area, the sequence selector 35 identifies the device being read as device 14, and the instrument is programmed to read glucose and protein as the device moves successively through positions P-7 and P-8 to stop position P-9.

The opaque code block 17 may have two functions: one is for identifying the particular test device to the instrument as previously described, and the other is to calibrate the instrument. Calibration is performed by the reaction sensor 38 looking at the calibration block 17 sampling the reflected light and converting the reflected light level into electrical signals used to standardize the electronic circuitry pre-programmed for each of the test devices.

The following is a description of a specific embodiment of the present invention. It will be appreciated that this is merely exemplary and that numerous changes can be made therein.

With reference to FIG. 4, the system is initially calibrated for use by inserting a first test device such as for example strip 1 in FIG. 1, which has been dipped into a zero calibration solution and thereafter inserting a second test device which has been dipped into a high positive solution, whereby the system is calibrated to measure input reactions which fall within the range selected by the use of the two calibration test devices. More specifically, the first or zero calibration test device may, for example, be dipped in a normal urine sample to thereby provide negative responses on each reagent block thereof, and the second or high positive calibration test device may be dipped into solution such as a synthetic urine which provides the maximum high positive values for each reagent block thereof.

More specifically, with placement of the zero calibration test device 10 on the table 43 and advancement of the test device 10 to move the code block 17 into readout position, photosensor 41 detects the code block 17 and provides suitable signals over path 42 to the code sensor circuit 19. The code sensor circuit 19 in a more basic embodiment may comprise a simple stepping switch which advances one count as each of the successive blocks is moved into readout position. In such arrangement, the count output of the counter in the sensor 19 in effect represents a position on the test device. Thus, if each of the reagent areas shown in test device 1, FIG. 1, has the same assigned position on each strip, the count output will therefore identify such reagent.

In a more sophisticated embodiment, the photosensor means 41 may comprise a plurality of sensors which electronically or mechanically detect which one of the strips shown in FIG. 1 is being processed, and in such event the count output from the code sensor 19 will represent correspondingly different reagents for the different test devices. For the purpose of convenience the more basic embodiment is described hereinafter.

With continued movement of the test device 10 to move the first reagent block, such as 18a, beneath the read head, the light beam is reflected back to photosensor 38 which, via path 22, provides an output signal which has a value related to the amount of light reflected by reagent block 18a. As shown in FIG. 4 the resultant signal is fed to the input of a voltage controlled oscillator 50 of the calibrate and amplify circuit 23 for translation into an output signal which will vary in frequency from approximately 10 to 100 KHz with the value of the voltage of the signal input thereto by photosensor 38.

The frequency output of voltage controlled oscillator 50 is fed through gate 52 under the control of the output signal from sequence control circuit 54 via path 27. In addition, as the block 18a is moved into position, the light beam is interrupted, and a read signal is output by photosensor 41 over path 42 to the input of a code sensor circuit 19.

Sequence control circuit 54 via path 64 inputs a signal to timer 21 which responsively provides a signal for one-tenth of a second over path 70 and path 27 to gate 52, enabling the same to gate, for a period of one-tenth of a second, the output signal of the voltage controlled oscillator 50, the latter signal representing the amount of light reflected by the reagent block 18a.

The frequency signal output of gate 52 as applied over conductor 72 is fed to a counter 74, which in one embodiment comprised a pair of logic circuits, commercially available as 74197, serially connected to effect the division of the frequency signal output by a factor of 256. The output of counter 74 is fed to a zero register 78 over path 76. Thus, for a gated period of one-tenth second, the zero register 78 will count the pulses output from counter 74 which represent the amount of reflected light from the first reagent block of the zero calibration test device.

At the end of one-tenth of a second readout period, the timer 21 removes the timing signal from path 70 and sequence circuit 54 removes the gating signal from gate 52 to terminate the signal input to counter 74 and register 78. In addition, sequence circuit 54 via load path 80 enables the eight bit count which exists on the output of the zero register 78 to be transferred to a buffer register 82. The same load signal from sequence circuit 54 is also fed over conductor 80 to the load input of a memory circuit 84 to cause the parallel transfer of the eight bit output of buffer register 82 into a first section of a memory 84 which has been preassigned to store the zero calibration word. The zero word for the first reagent block has now been stored in memory 84. Buffer register 82 may comprise two logic circuits, commercially available as 74197, having their eight bit input parallel connected to the eight bit output of the zero register 78, and memory circuit 84 may comprise a pair of 7489 devices which have their eight bit inputs parallel connected to the eight bit outputs of buffer register 82.

It will be apparent that as the actuator 45 causes the table 43 to sequentially advance the blocks on the carrier strip into the readout position, the system will operate to provide a zero word in the corresponding section of memory 84 for use in the testing of unknown blocks. In one embodiment, up to seven different types of reagent blocks may be included on the various strips, and accordingly the memory 84 was provided with the capacity to store eight different words to represent the zero value for the eight different reagents, and eight different words which represent the high positive value for each such reagent.

A test device which has been dipped into the high positive solution is now placed on the carrier for the purpose of providing a word input into memory 84 which represents the high positive value for each of the reagent blocks such as 18a, 18b and 18c on the test device 10.

As the start button 44 is operated, and actuator 45 advances code block 17 to the readout position, the code sensor circuit 19 operates to provide output signals over path 60 to identify to the system the particular test device being processed.

Photosensor 41 in detecting the entry of the block 18a into the readout position outputs a read signal via path 42 to cause the code sensor 19 to output a signal via path 20 to the sequence circuit 54 which outputs a signal over path 86 to the load input of zero register 78. As a result, the parallel bit output of the first zero word in memory 84 is input to the zero register 78. Memory 84 outputs the complement of the number stored in memory 84 over path 102, and as a result, the input to the zero register 78 is the 256 complement of the number which was stored in memory 84 in the zero calibration step. As will be shown, the purpose of the transfer of the complement of the zero calibration word to the zero register 78 effects substraction of the value represented by such word from the high positive calibration signal which is to be now provided.

That is, with the advance of block 18a into the readout position photosensor 38 detects the light reflected and outputs over path 22 to the voltage controlled oscillator 50 a signal having a value related to the amount of reflected light. The output of the voltage controlled oscillator 50 is gated to counter 74 for one-tenth of a second under the control of timer 21 and sequence circuit 54 in the manner heretofore described. Counter 74, in turn, outputs a pulse to the zero register 78 for each 256 input pulses, which signals represent the high positive value in the calibration step for the first block 18a.

As the signals are input to the zero register 78 as a result of the inputting of a word representative of the high positive value for the first block 18a, the zero register 78 is serially clocked from the value of the complement signal stored therein toward the total count capacity of the register 78 (count 255 in the present example). The input signal over path 76 after count 255 is reached in register 78 results in an empty signal output over path 90 to the clock input of a flip-flop circuit 92. Flip-flop circuit 92, via the Q output and path 94, enables a gate 96 to gate the signals output from voltage controlled oscillator 50 to the clock input on a divider register 100 via path 98.

Digressing briefly, and by way of example, assuming reagent block 18a is responsive to pH, and that the zero count represented by the word stored in memory 84 as a result of zero calibration was a numerical value of 20, and that the numerical value of the word stored in memory 84 to represent the high positive value was 200, the complement input to zero register 78 is 256 minus 20 or 236 at the start of the count input during the high positive readout for reagent block 18a. As the signals are now input over path 76 to the zero register 78 during the high positive calibration, the count advances from the complement input 236, and as the count is advanced by the pulse input over path 76 to a count of 256, a pulse over empty conductor 90 to the flip-flop 92 causes the further pulses output from the voltage controlled oscillator 50 to be fed over gate 96 and path 98 to the divider register 100.

The divider register 100 may be a pair of logic circuits, commercially available as 74197, which are serially connected to the output path 98 and which therefore outputs a pulse over path 104 in response to each 256 counts input over path 98. The signal output over conductor 104 after each 256 counts input to divider register 100 is fed to a one-shot circuit 106, which is of the type commercially available as a 74121, the output of which is connected over path 108 to the clock input of buffer register 82. The buffer register 82 thus acts as a counter for the high positive value minus the zero calibration value as divided by 256.

As the test device is advanced to bring successive ones of the reagent blocks 18b and 18c (etc.) beneath the readout position, successive high positive eight bit words are stored in memory 84 to indicate the high positive value for each of the different reagent blocks of the test device.

Summarily, at this time memory 84 includes up to seven words which represent the zero value of each of the reagents which is to be tested, and the seven words which represent the high positive value of each of the reagents to be tested.

Digressing briefly at this time, reference is made to a read only memory 110 which is a device commercially available as an IM 5600 and which is preloaded for use with the different thresholds of each of the reagents. More specifically, with reference to the Table shown below, it will be seen that a pH test block may have five different reaction ranges respectively represented by correspondingly different counts output by the divider register 100 (i.e., counts 0–225). The read only memory 110 is preloaded in a known manner to indicate the discrete thresholds for each of the different reagents. Thus, in a typical example, the first pH reaction range is shown to be 0–2, the second pH reaction range is shown to be 3–44.

TABLE

| pH | Decode Points (Range) |
|---|---|
| 5 | 0–2 |
| 6 | 3–44 |
| 7 | 45–128 |
| 8 | 129–213 |
| 9 | 214–255 |

As the read only memory 110 is addressed by the system in a manner to be shown, it will output the 256 complement of the threshold indicated over path 114 to a decoder 112 for the purpose of comparison with the signals input thereto by the divider register 100 in a manner to be described.

Returning now to the readout of the unknown reagent blocks of a test device, as the device is placed on table 43 and the code block 17 is advanced to the readout position, the photosensor 41 provides an output signal to code sensor 19 over path 42, and, over path 60, sensor 19 provides an ID signal to an access register 116, which identifies the particular strip being processed. As the actuator 45 advances the table 43 to move the first reagent block 18a with the unknown reagent into readout position, code sensor 19 provides a signal over path 60 to the access register 116 which identifies the reagent block which is being read out.

As noted above, in a less complicated arrangement code sensor 19 may comprise a simple stepping device which advances one word as each reagent block is detected, and the reagent blocks on the test device in the present example will be represented by the count output of the stepping device over path 60 (i.e. code block 17 would be 00, reagent block 18a would be 001, reagent block 18b would be 002, etc.). The access register 116 in response to the count signal over path 60 provides a three bit word to a buffer counter 121 which identifies the particular reagent block being processed (in the present example, 001 to identify the pH reagent block 18a).

The three bit signal output of access register 116, which identifies the particular reagent block being processed, is also fed out over path 120 to a coincident circuit 122. Assuming that the printer 128 (which may include a conventional stepper print wheel with the desired character reading thereon) is in a position other than pH5, the signal output from the printer fed over path 130 to coincident circuit 122 will be different from that fed over path 120, and coincident circuit 122 thereupon responsively provides a signal output over path 124 and an OR gate 126 to the stepping input of the printer 128 to cause the printer to advance until such time as the desired position (pH5) is reached. At that time the signal input from the printer on path 130 and the signal input over path 120 from the access register will be coincident and the signal output over path 124 will be removed to terminate the stepping of the printer 128.

Returning to the readout position, as block 18a is moved into the readout position, the read signal over path 42 from photosensor 41 via code sensor 19 and sequence circuit 54 is operated as before to enable gate 52 to gate the signal output of the voltage controlled oscillator 50 over path 72 to the counter circuit 74 and over path 76 to the zero register 78.

As before, sequence circuit 54 is also operated with receipt of the read signal to output a load signal over path 86 to cause the complement of the zero calibration value for the first reagent block (18a) to be fed over path 102 to the zero register 78.

In addition, while a read signal over path 42 indicates that a reagent block is in the readout position, sequence circuit 54, via the access input to memory 84, is also operative to advance the memory 84 one more access step to cause said memory to output the corresponding span word for the pH reagent to the divider register 100.

With the complement of the zero calibration value from the pH reagent now in the zero register 78 and the high positive value now in divider register 100, and timer 21 operated as before described in response to the read signal output from photosensor 41, the output signals of the voltage controlled oscillator 50 are gated over gate 52 and the described path to the zero register 78. Zero register 78 counts up from the zero calibration value (which in the present example was 236) in the direction of the total count 256 of the register. As count 255 is reached, the following count over path 76 causes the zero register 78 to provide an output signal over path 90 to flip-flop 92 to cause the output of the voltage controlled oscillator 50 to be gated through gate 96 to the divider register 100 over path 98.

The divider register 100, as noted above, registers the complement of the high positive value, and the signal input over path 98 drives the divider register 100 from such value to count 256, whereupon register 100 outputs a signal over path 104 to the one shot circuit 106 and over path 132 to the clock input of the decoder register 112.

It will be recalled that the access register 116 on path 118 and buffer 121 caused the complement of the first threshold (See Table) for the pH reagent which was loaded into read only memory 110 to be output over path 114 to the decoder register 112. Accordingly, as the clock inputs are received over path 132, the decoder register 112 advances from the complement for threshold 2 (254 in the present example), and at such time as the total count of 256 is reached, the signal over conductor 134 to a one shot circuit 136 results in an output signal over path 138 to buffer 140 which, over path 142, causes printer 128 to advance one step.

Buffer 140 absorbs the count output from the one shot circuit 136 which is operative at a much higher rate than the printer device 128. That is, as seen in the Table, the pH reagent may have as many as five thresholds, and in the event that signals representing the highest value threshold are input over path 132 to the decoder register 112, the buffer may store as many as five counts before the printer 128 is advanced to represent the change of threshold. The buffer 140 outputs the stored signals over conductor 142 and OR gate 126 to the step input of the printer 128 to cause the wheel to advance over the successive steps. At such time as the buffer 140 is empty, a signal over empty conductor 146 is fed to the hammer input of the printer 128 to cause the printer to printout the value to which the printer wheel has been advanced by the output signals of buffer 140.

All of the circuits, with the exception of the access register 116 and the low calibration and high calibration value set in memory 84 are reset as each block is advanced into the readout position by reason of the detection thereof by photosensor 41 and the signal supplied therefrom to the code sensor 19 and sequence control 54. Accordingly, the system is operative with each successive readout of a reagent block to compare such value with the threshold values stored in the read only memory 110 and to provide an output signal which controls the printer 128 to provide a printout of such information.

EXAMPLE

This Example describes the preparation of the device 14 shown in FIG. 1. Such test devices are for quantitatively determining protein and glucose in biological fluids such as urine.

Preparation of Protein Test Reagent

Sheets of Eatman and Dikeman No. 651 filter paper, approximately 10 cm square, were saturated with the following solution:

| | |
|---|---|
| 2.2 parts of 2M aqueous sodium citrate | |
| 7.8 parts of 2M aqueous citric acid | 100 ml |
| Tetrabromophenol blue (0.08 weight) | |
| % in 95% ethanol | 100 ml |
| Total Volume | 200 ml |

The wet sheets were dried at 100°C for 15 minutes, and further cut into squares 0.5 cm × 0.5 cm.

Preparation of Glucose Test Reagent

Sheets of Eatman and Dikeman No. 641 filter paper were saturated with the following solution:

| | |
|---|---|
| Sodium Alginate | 5.0 g |
| Polyoxyethylene Sorbitan Monooleate Wetting Agent (1% solution) | 50.0 ml |
| Gelatin | 12.0 g |
| o-Tolidine-2HCl | 2.5 g |
| Buffer (pH 4.8 – 5.0, consisting of citric acid 22.2 g/300 ml and sodium citrate 97.8 g/300 ml) | 300.0 ml |
| Glucose Oxidase | 18.2 g |
| Peroxidase (horseradish) | 380.0 mg |
| 95% Ethanol | 125.0 ml |

The sheets were dried as described above in the protein test preparation and cut into 0.5 cm squares.

Preparation of Test Devices

Transparent polystyrene film approximately 0.0254 cm thick was cut into strips 8.2 cm long by 0.5 cm wide. Squares of protein test reagent paper prepared as above were attached to one end of each strip. Squares of glucose test reagent papers were attached to the plastic strips spaced approximately 2 mm inwardly from the protein test squares. Blank squares of white paper 0.5 cm square were then attached to the strips spaced approximately 2 mm inwardly from the glucose test squares. Alternatively white opaque areas may be printed on the test strips in place of the white paper squares. The result was test device 14 as shown in FIG. 1.

USE OF THE TEST DEVICES

A test device as prepared above is momentarily dipped into and removed from a urine test fluid, and the excess fluid removed from the device by shaking. Prior to contact with the test fluid, the protein test reagent area is a yellow color. Upon contacting protein in the fluid, the color changes from yellow (negative) to a bluish green (over 1000 mg %), depending upon the amount of protein in the fluid. The results are reported in the following increments:

negative, trace, 30 mg % (+), 100 mg % (++) 300 mg % (+++) and over 1000 mg % (++++).

The glucose test reagent area is a red color prior to contacting the test fluid and changes to a deep purple upon contacting glucose in said fluid. The results are reported as negative, small, moderate and large.

Upon removal of the excess fluid from the test device the start switch 44 of the test instrument is depressed and the test device 14 is placed in operative position on the table 43 of the test instrument. The test device 14 moves with the table 43 through the light beam from position P-0 toward position P-9. When the device 14 reaches position P-6, the light beam is interrupted by code block 17 and the light is thereupon reflected from this white code block back to detector 38, to cause the instrument to be automatically calibrated by means of the calibrate module 23. With continued movement of test device 14 the light beam is again interrupted by the glucose test area in position P-7. The code sensor and read signal module 19 in conjunction with test sequence selector 35 determines that the device is a glucose-protein test device and the function generator 29 is advised accordingly. When the light beam is centered on the glucose test area, the read command is activated and the decode to print module 31 advises the printer 33 to report the proper results from negative to large, depending upon the amount of glucose in the urine test fluid. The procedure is repeated for the protein test reagent when the light beam is centered on the protein test area in position P-8. Upon reaching position P-9, the actuator 45 returns the table 43 to its Start position, and the instrument automatically shuts itself off.

What is claimed is:

1. A semi-automatic test system for determination of chemical constituents in a fluid, comprising a carrier member, a plurality of test reagents on said carrier member in predetermined relation, each of said test reagents being reactable with a specific constituent in a fluid and code means on said carrier member for use in identifying the test reagents located on said carrier member, code sensing means for sensing said code means, reaction sensing means operable responsive to reactions of said test reagents respectively to provide output signals, and readout means controlled by said code sensing means and responsive to the output signals from said reaction sensing means.

2. A test system as in claim 1 wherein the carrier member comprises a strip of transparent plastic film.

3. A test system as in claim 1 wherein said test reagents are incorporated with bibulous matrices which are attached to the carrier member.

4. A test system as in claim 2 wherein the code means is an opaque area positioned on the carrier member a predetermined distance from one test reagent.

5. A test system as in claim 1 wherein the code means is one of a plurality of different indicia, each respectively representing a different combination of said test reagents.

6. A test system as in claim 1 wherein said reaction sensing means is initially responsive to said code means to provide an output signal to said readout means for calibration of the latter.

7. A semi-automatic test system for determination of chemical constituents in a fluid, comprising a test device comprising a strip of transparent plastic film, a plurality of test reagents on said strip in predetermined spaced relation, each of said test reagents being reactable with a specific constituent in a fluid, and an opaque area on said strip at a predetermined location relative to the test reagents; movable, transparent table means adaptable to receive said test device; a light source for directing a light beam toward said table means, movement of said table means with said test device thereon causing said opaque area and said test reagents to be moved through positions in which they successively interrupt said light beam; light responsive code sensing means positioned to receive said light beam when not so interrupted; reaction sensing means operable responsive to reactions of said test reagents when said test reagents are respectively in interrupting relation to said light beam to provide output signals; function means connected to said code sensing means and operative to interpret the relative positions of the opaque area and the test reagents; and readout means cooperable with said function means and responsive to the output signal from said reaction sensing means.

8. A test device for determination of chemical constituents in a fluid and which is adapted for use with an instrument responsive to code means on the test device, said test device comprising a carrier member, a plurality of test reagents on the carrier member in predetermined relation, each of said test reagents being reactable with a specific constituent in a fluid, and code means on said carrier member for indicating to an instrument the particular test reagents which are on said carrier member.

9. A test device as in claim 8 wherein the carrier member comprises a strip of transparent plastic film.

10. A test device as in claim 8 wherein said test reagents are incorporated with bibulous matrices which are attached to the carrier member.

11. A test device as in claim 9 wherein the code means is an opaque area positioned on the carrier member in a predetermined position with respect to said test reagents.

12. A test device as in claim 8 adapted for use with a calibratable instrument, the code means of said test device indicating to the instrument the amount of calibration adjustment therein necessary when said test device is used with said instrument.

13. A test instrument for reading any selected one of a plurality of test devices each of which comprises a carrier member, a plurality of test reagents on said carrier member, each of said test reagents being reactable with a specific constituent in a fluid, and code means on said carrier member specific for the respective test device; said instrument comprising code sensing means for sensing the code means of a test device presented thereto, reaction sensing means operable responsive to reactions of test reagents on such test device to give output signals, and readout means controlled by said code sensing means and responsive to the output signal of said reaction sensing means.

14. A test instrument for reading any selected one of a plurality of test devices each of which comprises a carrier member in strip form to which are affixed code means and one or more test reagents at predetermined spaced intervals, said instrument comprising movable table means adapted to receive a test device to be read, reaction sensing means adjacent said table means and responsive to reactions of the reagents of a test device on said table means with constituents to be detected in a fluid, code sensing means adjacent said table means for sensing predetermined spaced intervals on a test device on said table means to identify said test device, and readout means responsive to said reaction sensing means and said code sensing means to provide an indication of reaction of test reagents with particular constituents in a fluid as a test device is carried by said table means past said code sensing means and said reaction sensing means.

15. In a test instrument for reading test devices each of which comprises a transparent carrier member to which code means in the form of an opaque block and one or more test reagents are affixed at spaced intervals, a movable transparent table member adapted to receive a test device to be read, a light source on one side of said table member for directing a light beam through said table, a photosensitive element on the side of said transparent table member opposite said light source, which element is positioned to receive said light beam and gives an output signal in response thereto, said light beam being interrupted by the opaque block and test reagents respectively on a test device carried therethrough on said table member, and function means connected to said photosensitive element and operable to identify a particular test device on the table member responsive to output signals received from said photosensitive element as said test device is moved through said light beam on said table member.

16. A test system as in claim 1 wherein the output signals provide quantitative indications of the reactions of said test reagents.

17. A test system as in claim 2 wherein said test reagents are incorporated with bibulous matrices which are attached to said carrier member and said code means is an opaque area.

18. A test system as in claim 3 wherein said bibulous matrices are paper.

19. A semi-automatic test system as in claim 7 wherein the output signals provide quantitative indications of particular constituents in a fluid.

20. A test device as in claim 8 wherein said code means is in a predetermined position with respect one test reagent.

21. A test device as in claim 10 wherein said matrices are paper.

22. In combination,
a dip-and-read type test device comprising a carrier member, a plurality of test reagents on said carrier member, each of said test reagents being reactable with a specific constituent in a fluid, and code means on said carrier member;
code sensing means responsive to said code means to give a code output signal;
reaction sensing means responsive to reaction of said test reagents to provide reaction output signals;
table means for receiving said test device, said table means and said code sensing and reaction sensing means being mounted for relative motion along a given path such that said code means and said test reagents of a test device on said table means are presented to said code sensing means and said reaction sensing means respectively in predetermined order; and
readout means responsive to said code output signal and said reaction output signals.

23. A combination as in claim 22 wherein said test reagents are incorporated with bibulous matrices which are attached to said carrier member.

24. A combination as in claim 23 wherein said bibulous matrices are paper.

25. A combination as in claim 22 wherein said carrier member is a transparent plastic film.

26. A combination as in claim 25 wherein said code means is an opaque area.

27. A combination as in claim 26 where in said test reagents are each incorporated with a bibulous paper matrix which is attached to said carrier member.

28. A combination as in claim 27 wherein said opaque area is in a predetermined spaced relation with respect to one of said test reagents.

29. A combination as in claim 25 wherein at least the portion of said table means adjacent the code means and the test reagents of a test device thereon is transparent.

30. A combination as in claim 29 wherein said code sensing means includes a photosensitive element and said reaction sensing means includes a photosensitive element, and there is a light source for directing a light beam through said table means toward said code sensing photosensitive element, said reaction sensing photosensitive element being positioned to receive light reflected from the code means or a test reagent of a test device on said table means when said code means or test reagent is in interrupting relation to said light beam.

31. A test system for determination of chemical constituents in a fluid comprising a carrier member, at least one test reagent on said carrier member reactable with a specific constituent in a fluid, code means on said carrier member at a predetermined distance from said at least one test reagent, code sensing means for sensing the predetermined distance between said code means and said at least one test reagent, reaction sensing means responsive to reaction of said at least one test reagent to provide an output signal, and readout means controlled by said code sensing means and responsive to the output signal from said reaction sensing means.

32. A test system as in claim 31 wherein said at least one test reagent is incorporated with a bibulous paper which is attached to said carrier member.

33. A test system as in claim 31 wherein said carrier member is transparent.

34. A test system as in claim 33 wherein said code means is an opaque area.

35. A test system as in claim 31 wherein said readout means is calibratable and wherein said reaction sensing means is responsive to said code means to provide a calibrate output signal to said readout means for calibration of the latter.

36. A test device for determination of a chemical constituent in a fluid and which is adapted for use with an instrument responsive to code means on the device, said device comprising a carrier member, at least one test reagent on said carrier member, said at least one test reagent being reactable with a specific constituent in a fluid, and code means on said carrier in a predetermined spaced relation with respect to said at least one test reagent for indicating to an instrument by such spaced relation the particular at least one test reagent on said carrier member.

37. A test device as in claim 36 wherein said carrier is transparent.

38. A test device as in claim 37 wherein said code means is an opaque area.

* * * * *